United States Patent [19]

Merle

[11] Patent Number: 4,862,939
[45] Date of Patent: * Sep. 5, 1989

[54] STIFFENING PLY FORMED ... METHODS FOR OBTAINING SUCH ARTICLES

[75] Inventor: Michel Merle, Clermont-Ferrand, France

[73] Assignee: Compagnie Generale des Etablissements Michelin, Clermont-Ferrand, France

[*] Notice: The portion of the term of this patent subsequent to Dec. 2, 2003 has been disclaimed.

[21] Appl. No.: 183,504

[22] PCT Filed: Jun. 24, 1985

[86] PCT No.: PCT/FR85/00172
§ 371 Date: May 14, 1986
§ 102(e) Date: May 14, 1986

[87] PCT Pub. No.: WO86/00853
PCT Pub. Date: Feb. 13, 1986

Related U.S. Application Data

[63] Continuation of Ser. No. 865,740, May 14, 1986, abandoned.

[30] Foreign Application Priority Data

Jul. 19, 1984 [FR] France ................... 84 11749

[51] Int. Cl.⁴ .............................. B60C 9/18
[52] U.S. Cl. .................... 152/452; 152/538
[58] Field of Search ........... 152/452, 526, 527, 532, 152/537, 563, 538; 156/123, 128.1, 125; 139/408, 415; 428/245, 259, 295

[56] References Cited

U.S. PATENT DOCUMENTS

| 697,390 | 4/1902 | Beck | 152/563 X |
| 697,391 | 4/1902 | Beck et al. | 152/563 X |
| 1,285,084 | 11/1918 | Evans | 152/563 X |
| 1,756,151 | 4/1930 | Gardiner | 139/408 |
| 3,000,771 | 9/1961 | Runton | 139/408 |
| 3,197,021 | 7/1965 | Williams | 139/411 |
| 3,205,119 | 9/1965 | Paul | 139/415 |
| 3,900,062 | 8/1975 | Neville et al. | 152/527 |
| 3,919,018 | 11/1975 | Schroeder | 152/563 X |
| 4,580,611 | 4/1986 | Merle | 152/452 |
| 4,625,785 | 12/1986 | Merle | 152/527 X |

FOREIGN PATENT DOCUMENTS

| 0107125 | 5/1984 | European Pat. Off. . |
| 0131855 | 1/1985 | European Pat. Off. . |
| 513957 | 2/1921 | France . |
| 1453467 | 9/1966 | France . |
| 2540792 | 8/1984 | France . |
| 1273528 | 5/1972 | United Kingdom ............... 139/415 |

Primary Examiner—Raymond Hoch
Attorney, Agent, or Firm—Brumbaugh, Graves, Donohue & Raymond

[57] ABSTRACT

A stiffening ply intended for use in an article, particularly a pneumatic tire, is characterized by the fact that the ply is formed at least in part of a fabric having the following properties:
 (a) the fabric has a three-dimensional body and stiffening threads;
 (b) substantially all the voids in the fabric are capable of being filled by a material which forms part of the structure of the article;
 (c) the fabric has two main faces connected by two side faces;
 (d) the cross section of the fabric has a width which varies from one main face to the other.

30 Claims, 9 Drawing Sheets

STIFFENING PLY FORMED ... METHODS FOR OBTAINING SUCH ARTICLES

This application is a continuation of application Ser. No. 865,740, filed on May 14, 1986, now abandoned.

The present invention relates to reinforced articles. More particularly, the invention concerns articles having reinforcements, so-called "stiffening reinforcements," intended to stiffen one or more parts of such articles, each of these reinforcements being formed of at least one ply known as a "stiffening ply." Such articles can, for instance, be straps, tubes, conveyor belts and pneumatic tires.

In particular, the invention concerns pneumatic tires having a stiffening reinforcement intended to stiffen their crown so as to permit said crown to withstand the stresses resulting from travel. This reinforcement is referred to as the "crown reinforcement" below.

Every known stiffening ply has a generally substantially two-dimensional structure, in the form, for instance, of an assembly of stiffening cables arranged in a single thickness.

Such plies can be used as is for the production of pneumatic tires by building on a drum or by casting in a mold, as described, for instance in the Japanese Patent Application published after examination under No. 57-12 687 or in the European Application published under No. 5 423. In these processes, these plies are not disposed directly on the surface of the drum or mold, since the tires would in such case be of excessive fragility upon travel.

Furthermore, in order to impart the necessary mechanical properties to pneumatic tires, it is indispensable to arrange said plies at a given level within the thickness of the crown. These plies are therefore arranged on a material which has been previously placed on the surface of the drum or mold so that these plies are protected by a substantial thickness of material in the finished tires. These techniques lead to complicated and/or costly operations which result in variations in quality from one tire to the next during the course of manufacture.

In West German published patent application No. 28 30 331 it is proposed to povide these plies with spurs and then to arrange these plies in a mold in such a manner that the spurs rest against the surface of the core of the mold. The purpose hereof is to cover the plies on all sides by the poured material. The number of these spurs is necessarily limited, resulting in the formation of only a few zones of contact and large individual sections. This results in substantial discontinuities within the tire and risks of defective attachment. Furthermore, these spurs destroy the symmetry of revolution within the tire and the plies assume a practically prismatic shape.

All of these drawbacks are present even if the material which forms the spurs and the poured material are similar or identical and these drawbacks are the source of vibratory phenomena which impair both comfort and the life of the tire.

French published Patent Application No. 2 421 969 describes a fabric of three-dimensional structure having two groups of warp threads; the warp threads of a first group are distributed to form the body of the fabric, while the warp threads of the second group are distributed to form at least one separating woven ply. This fabric thus makes it possible to produce a system for connecting two materials of different nature without the products in question being in contact, in view of the presence of the separating ply. Such a fabric is not suited for the production of stiffening reinforcements for pneumatic tires.

French Patent Application No. 83-02 625 (which corresponds to U.S. Pat. Nos. 4,580,611 and 4,625,785) describes a stiffening ply intended to be used in a pneumatic tire, this ply being characterized by the fact that the ply is formed at least in part of a fabric having the following properties:

(a) the fabric has a three-dimensional body and stiffening threads arranged in the body and held by the body;

(b) substantially all the voids in the fabric are capable of being filled by at least one material which forms part of the structure of the tire.

This ply assures precise positioning of the stiffening threads in space within the tire, which makes it possible to produce tires of very uniform quality of manufacture, with practically no risk of deterioration as a result of displacement of these stiffening threads during the course of manufacture. It may, however, happen that the side faces of this play have an excessive density of threads which may limit the permeability of these faces in a direction perpendicular to them. It may also happen that these side faces are arranged in zones of high stresses, which may cause deterioration of the tire in these zones, in contact with these faces.

The object of the invention is to avoid these drawbacks.

Accordingly, the stiffening ply of the invention, which is intended to be used in an article, is characterized by the fact that the ply is formed at least in part of a fabric having the following properties:

(a) the fabric has a three-dimensional body and stiffening threads arranged in the body and held by the body;

(b) substantially all the voids in the fabric are capable of being filled by at least one material which forms part of the structure of the article;

(c) the fabric has two main faces connected by two side faces;

(d) when the fabric is arranged in such a manner as to have a generally flat shape, the main faces are substantially flat and parallel and every plane intersecting the main and side faces of the fabric forms a cross section the width of which, measured parallel to the main faces, varies from one main face to the other.

The invention also concerns plies of this definition which are impregnated with at least one material which enters into the structure of the articles which they are intended to reinforce. The invention also concerns articles having at least one stiffening ply according to the invention, as well as methods for obtaining these articles. The description which follows concerns more particularly pneumatic tires, but the articles in accordance with the invention may be other than pneumatic tires, for instance straps, tubes or conveyor belts.

The examples which follow as well as the figures corresponding to these examples in the drawing, all of which are diagrammatic, are intended to illustrate the invention and to facilitate an understanding of it without, however, limiting its scope.

Figure 14:
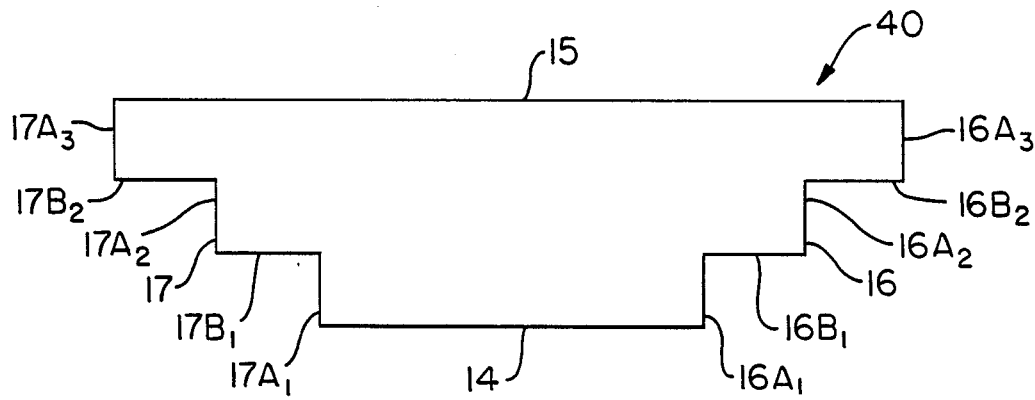
Figure 15:
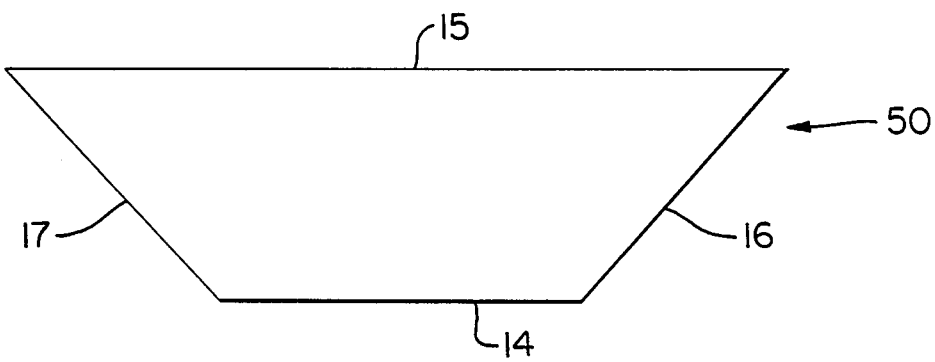
Figure 16:
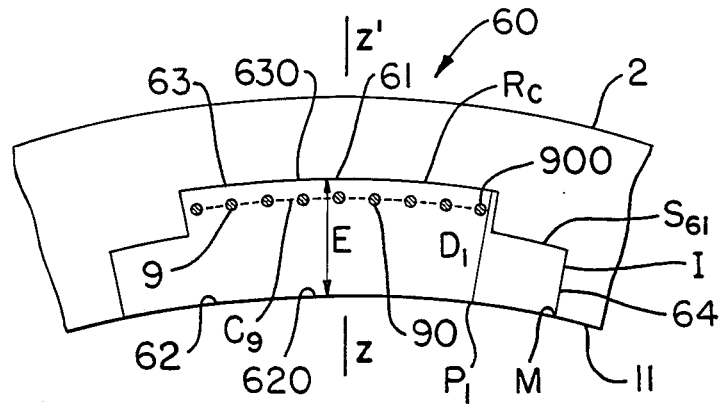
Figure 17:
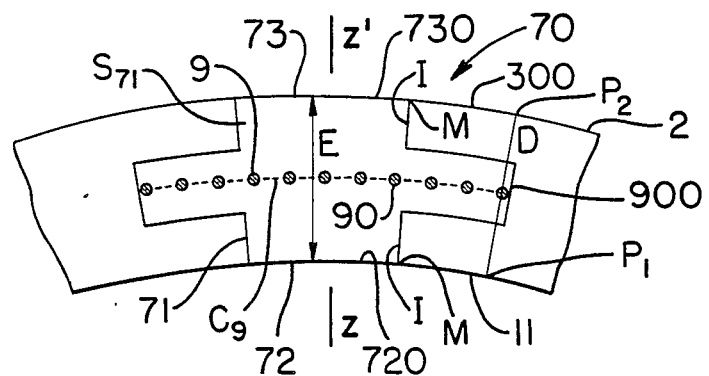
Figure 18:
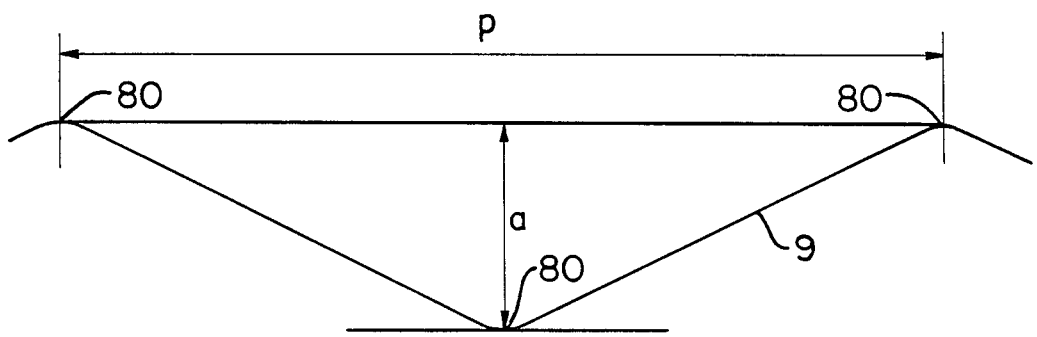

Each of FIGS. 14 and 15 shows in cross section another ply according to the invention;

Each of FIGS. 16 and 17 shows in radial section a portion of the crown of a pneumatic tire having another stiffening ply according to the invention;

FIG. 18 shows an undulated stiffening thread which can be used in a stiffening ply according to the invention.

Figure 1:
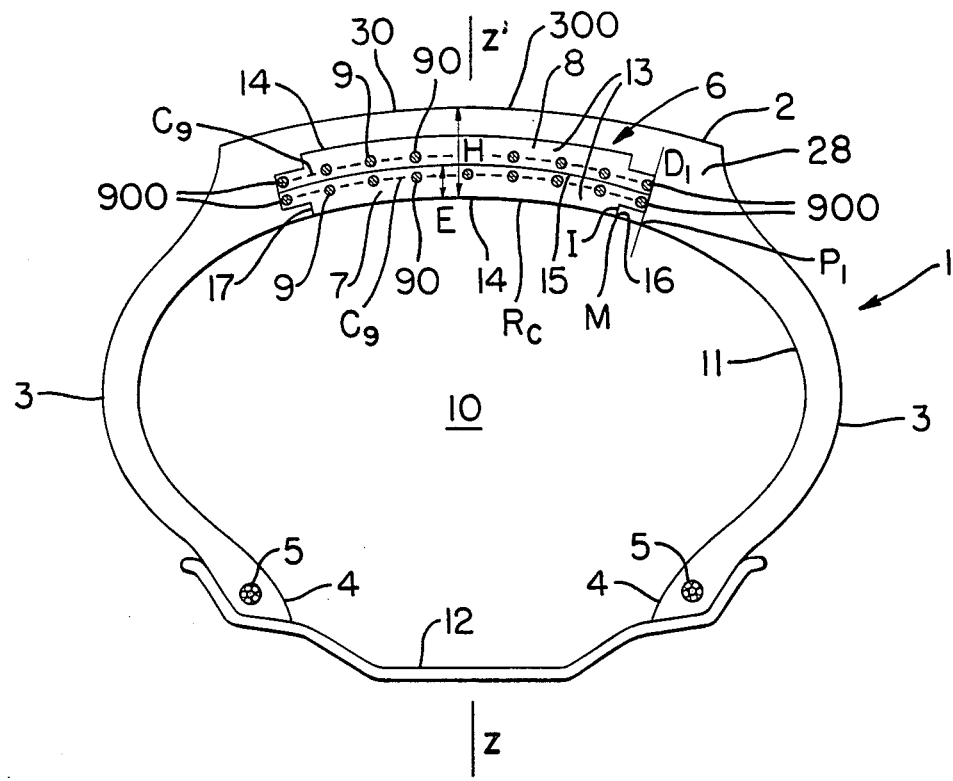
FIG. 1 shows, in radial section, a pneumatic tire having a crown reinforcement formed of two stiffening plies according to the invention.

FIG. 1 shows a pneumatic tire 1. This tire 1 has a crown 2, two sidewalls 3 and two beads 4, each bead being reinforced, for instance, by a bead ring 5.

The crown 2 has a stiffening reinforcement 6 consisting of two superposed plies 7, 8, referred to at times as "working plies" in the tire industry, each of these plies 7, 8 being developed in accordance with the invention.

Figure 2:
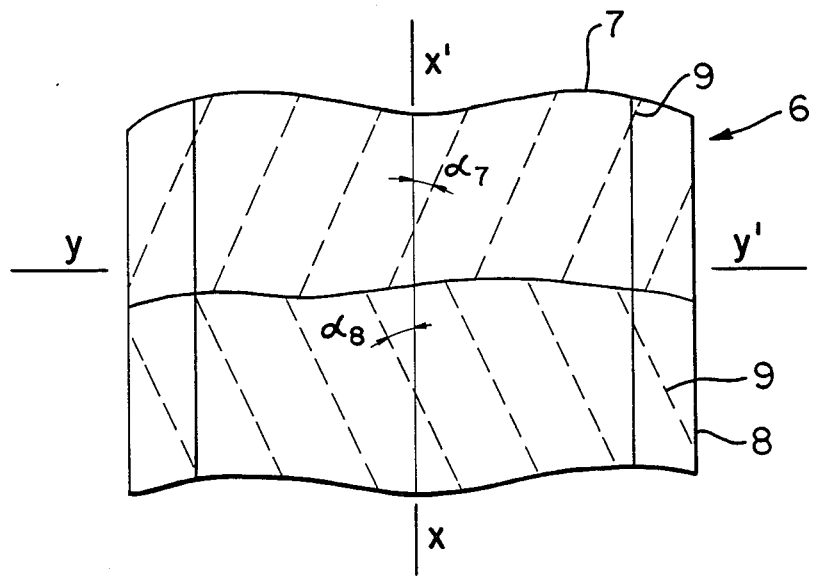
FIG. 2 shows, in top view, a portion of the crown reinforcement of the tire shown in FIG. 1.

FIG. 2 shows in top view a portion of these plies 7, 8, the entire portion of the crown 2 which is located above these plies being assumed removed. Each of the plies 7, 8 has stiffening threads 89 which are parallel to each other, the orientation of the stiffening threads 9 of one ply crossing the orientation of the stiffening threads 9 of the other ply. For clarity in the drawing, in FIG. 2 the stiffening threads 9 have been represented by dashed lines while the other elements forming part of the composition of the plies 7, 8 have not been shown, these elements being described in further detail below. The threads 9 of the ply 7 form an acute angle $\alpha_7$ with the equatorial plane of the tire 1, this equatorial plane being the plane perpendicular to the axis of revolution of the tire 1 passing through the middle of the crown 2. In FIG. 2, this equatorial plane is indicated schematically by the line xx' and the axis of revolution of the tire 1 is indicated schematically by the line yy', the equatorial plane being indicated schematically by the line zz' in FIG. 1. The threads 9 of the ply 8 form n acute angle $\alpha_8$ with the equatorial plane xx' (FIG. 2). These angles $\alpha_7$, $\alpha_8$ are arranged on opposite sides of the equatorial plane xx', each of these angles being, for instance, between 15° and 30°. For clarity in the drawing, the stiffening threads 9 have been shown further apart in each ply 7, 8 than they actually are.

The ply 7 is located below the ply 8, that is to say this ply 7 is closer to the inner cavity 10 of the tire 1 than the ply 8 is, the cavity 10 being defined by the inner face 11 of the tire 1 and the rim 12 on which the tire 1 is mounted, the tire being then inflated to its normal pressure of use, not under load.

In other words, the radial distance of the ply 8 is greater than the radial distance of the ply 7, these radial distances, which have not been shown in the drawing for purposes of simplification, being by definition measured with reference to the axis of revolution yy' in the equatorial plane. The ply 7 is called the "lower ply" and the ply 8 is called the "upper ply."

Figure 3:
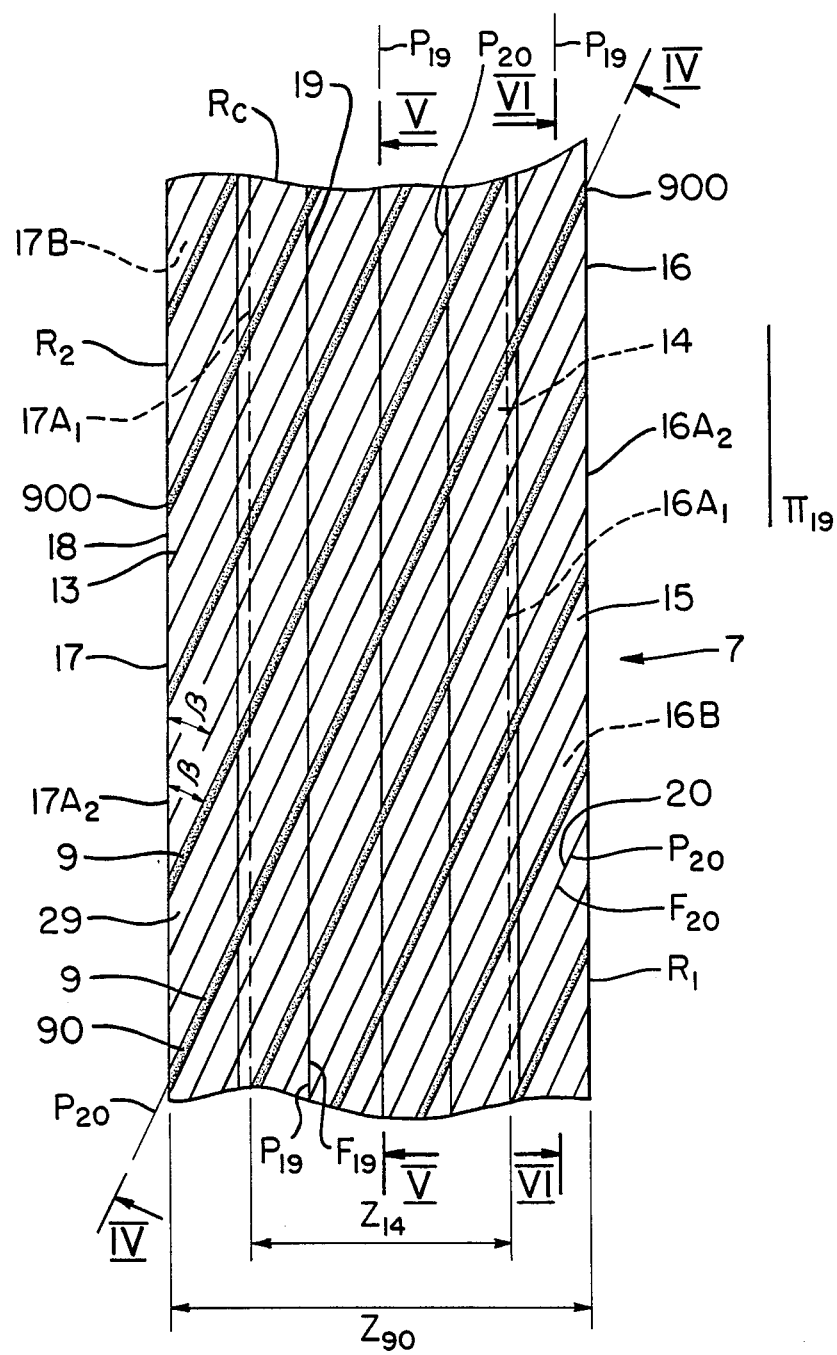
FIG. 3 shows, in top view, a portion of the lower ply of the crown reinforcement shown in FIGS. 1 and 2, this ply being formed of a fabric having a three-dimensional body.
Figure 4:
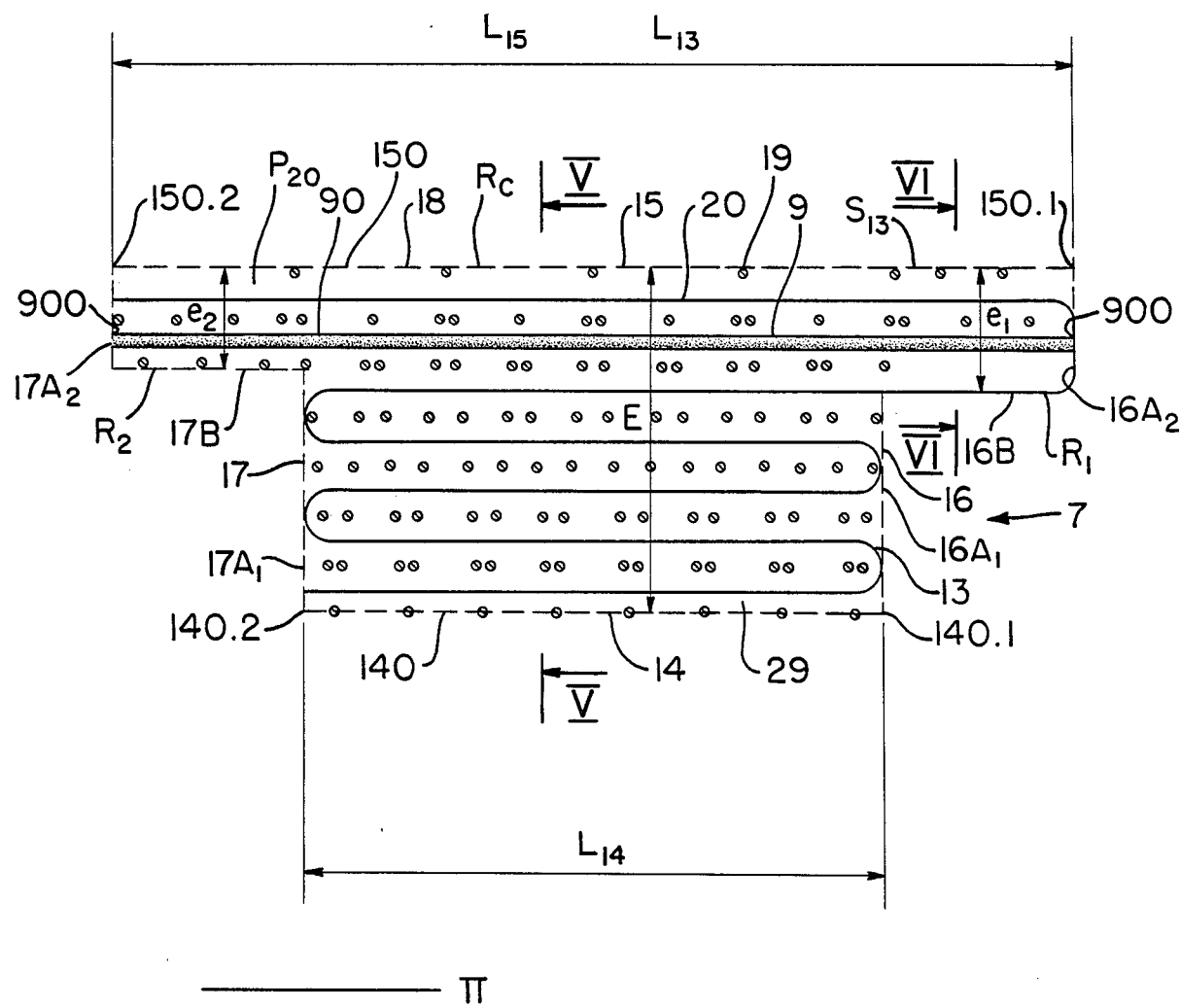
FIG. 4 shows in cross section the lower ply shown in part in FIG. 3, said section being taken along the line IV—IV of FIG. 3.
Figure 5:
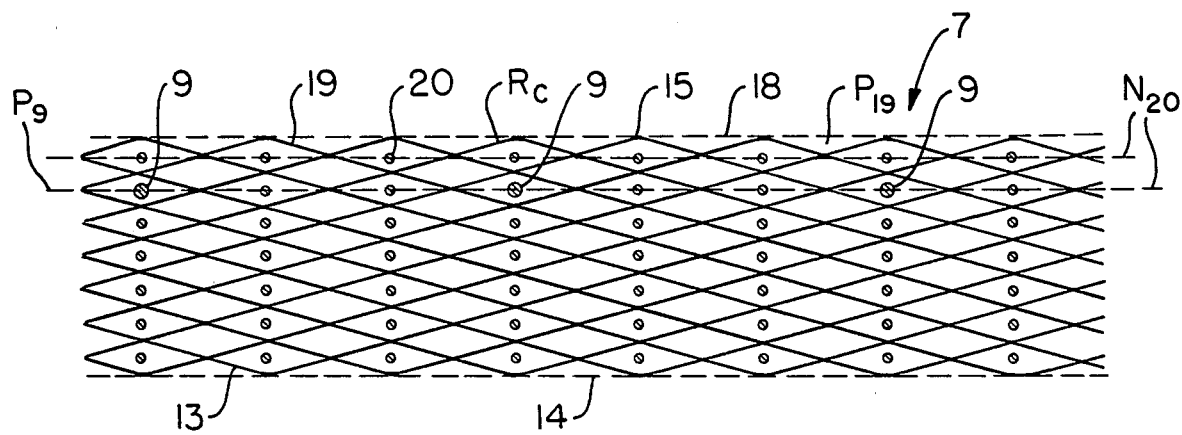
FIG. 5 shows in cross section a portion of the lower ply shown in FIGS. 3 and 4, this section being taken in the central region of the ply, along the lines V—V of FIGS. 3 and 4.
Figure 6:
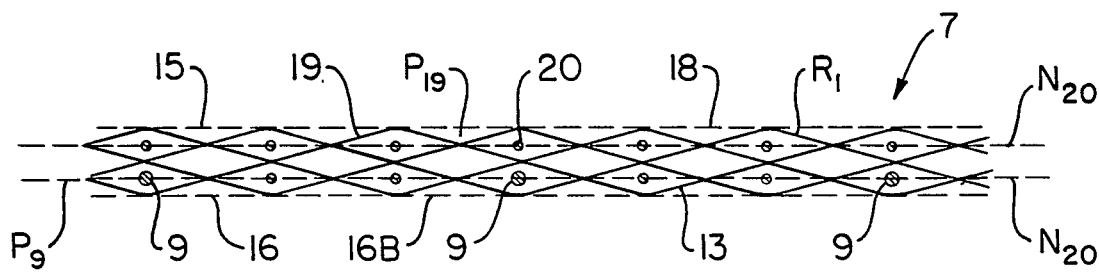
FIG. 6 shows in cross section a portion of the lower ply shown in FIGS. 3 and 4, this section being taken in a side region of the ply, along the lines VI—VI of FIGS. 3 and 4.

Each of FIGS. 3, 4, 5 and 6 shows a portion of the lower ply 7, FIG. 3 being a top view of this portion and FIGS. 4, 5, and 6 being sections through this portion. This lower ply 7 is formed of a fabric 13 having two main faces 14, 15. These faces 14, 15 are connected by two side faces 16, 17, which faces 14, 15, 16 and 17 may be represented in whole or in part in the form of dashed-line segments in FIGS. 3, 4, 5, 6. The main faces 14, 15 are substantially flat and parallel, that is to say the fabric 13 is shown in FIGS. 3 to 6 before its use in the crown 2, the fabric 13 being then assumed to be arranged in such a manner as to have a generally flat shape, the face 15 being the upper face of this fabric 13 and the face 14 being the lower face of this fabric 13.

The term "main face" which is used for purposes of simplification does not mean that the area of the main faces 14, 15 is necessarily greater than the area of the side faces 16, 17. Embodiments are in fact conceivable in which the area of the main faces 14, 15 is equal to or less than the area of the side faces 16, 17 but ordinarily the area of the main faces 14, 15 is greater than the area of the side faces 16, 17.

FIG. 4 is a cross section along a plane through the main faces 14, 15 and the side faces 16, 17 of the fabric 13. This plane is perpendicular to the main faces 14, 15, the plane being schematically indicated by the straight line IV—IV in FIG. 3. This plane forms a cross section $S_{13}$ shown in FIG. 4. In accordance with the invention, the width of this cross section varies from one main face to the other, this width being measured parallel to the main faces 14, 15. The maximum width of this section $S_{13}$ is designated $L_{13}$ in FIG. 4, this width $L_{13}$ being the largest dimension of the cross section $S_{13}$ when said dimension is measured parallel to the main faces 14, 15.

In this FIG. 4, the intersection of the plane of said figure with the lower main face 14 forms a trace 140 and the intersection of this plane with the upper face 15 forms a trace 150, these traces, which are shown in dotted line, being substantially rectilinear. The trace 140 meets the side face 16 at its end 140-1 and the side face 17 at its end 140-2 and, similarly, the trace 150 meets the side face 16 at its end 150-1 and the side face 17 at its end 150-2. By definition, the length $L_{14}$ of the trace 140 is the distance between the ends 140-1, 140-2 of this trace 140 and the length $L_{15}$ of the trace 150 is the distance between the ends 150-1, 150-2 of this trace 150. In the case of the example described in FIG. 4, the length $L_{14}$ of the trace 140 corresponding to the lower face 14 represents the minimum width of the cross section $S_{13}$. This length $L_{14}$ is less than the width $L_{13}$ while the length $L_{15}$ of the trace 150 corresponding to the upper face 15 is equal to the width $L_{13}$. The main face 14 is called the "narrow face." The conclusions would be the same for any plane intersecting the faces 14, 15, 16, 17.

The side face 16 is formed by three elementary faces $16A_1$, $16A_2$, 16B, the elementary faces $16A_1$, $16A_2$, being parallel to each other and connected by the elementary face 16B. The elementary faces $16A_1$, $16A_2$, are perpendicular to the main faces 14, 15, the elementary face $16A_1$ being connected to the narrow lower face 14 and the elementary face $16A_2$, being connected to the upper face 15. The elementary face 16B is parallel to the main faces 14, 15. The side face 17 is formed, in a manner similar to the side face 16, by three elementary faces $17A_1$, $17A_2$, 17B, the elementary faces $17A_1$, $17A_2$ being parallel to each other and connected by the elementary face 17B. The elementary faces $17A_1$, $17A_2$ are perpendicular to the main faces 14, 15, the elementary face $17A_1$ being connected to the lower face 14 and the elementary face $17A_2$ being connected to the upper face 15. The elementary face 17B is parallel to the main faces 14, 15. The elementary faces $16A_1$, $16A_2$ are parallel to the elementary faces $17A_1$, $17A_2$ and directed along the length of the fabric 13.

The volume of the lower ply 7 which is defined by the faces 15, $16A_2$, 16B and the extension of the face $16A_1$ constitutes a side region $R_1$ of thickness $e_1$ measured between the faces 15 and 16B. The volume of the lower ply 7 defined by the faces 15, $17A_2$, 17B and the extension of the face $17A_1$ constitutes a side region $R_2$ of thickness $e_2$ measured between the faces 15 and 17B. In the example described, the thicknesses $e_1$ and $e_2$ have substantially the same value. The volume of the lower ply 7 which is defined by the faces 14, 15 and by the faces $16A_1$, $17A_1$ and their extensions constitutes the central region $R_c$ of thickness E measured between the main faces 14, 15, the value of the thickness E being greater than that of the thicknesses $e_1$, $e_2$, this central Region $R_c$ being therefore the region of the lower ply 7 where the thickness is maximum. The thicknesses E, $e_1$, $e_2$ are measured along straight lines perpendicular to any plane which is parallel to the main faces 14, 15, one such plane $\pi$ being indicated schematically by a straight line in FIG. 4.

The fabric 13 has a three-dimensional body 18. The stiffening threads 9 of the lower ply 7 are arranged in the body 18 and held by the body 18. The body 18 is a woven body formed of warp threads 19 and woof threads 20. The term "thread" is to be taken in a very broad sense, that is to say each of the threads 9, 19, 20 may be formed, for instance, of a single unitary thread or by an assembly of several unitary threads forming, for instance, a cable, each unitary thread being possibly formed either of a single filament or of several filaments. Each of these threads 9, 19, 20 may also be formed, for instance, of an assembly of staple fibers or by one or more ribbons.

In FIG. 3, the threads 9, 19, 20 are shown as continuous lines. In FIG. 4, the threads 9, 20 are shown as continuous lines and the warp threads 19 are shown in cross section. In FIGS. 5, 6 the threads 9, 20 are shown in cross section and the warp threads 19 are represented by continuous lines.

FIG. 5 is a cross section through a portion of the lower ply 7, this section being taken in the central region $R_c$ of this portion along a plane perpendicular to the main faces 14, 15 and parallel to the elementary faces $16A_1$, $16A_2$, $17A_1$, $17A_2$.

FIG. 6 is a cross section through a portion of the lower ply 7, this section being taken in the side region $R_1$ of this portion, along a plane perpendicular to the main face 15 and to the elementary face 16B, the plane of FIG. 6 being parallel to the elementary faces $16A_1$, $16A_2$, $17A_1$, $17A_2$. In FIGS. 3 and 4, the section plane of FIG. 5 is schematically indicated by the straight line V—V and the section plane of FIG. 6 is schematically indicated by the straight line VI—VI.

It can be noted from FIG. 5 that each warp thread 19 undulates between the main faces 14, 15 being alternately tangent to one of these main faces and then to the other.

From FIG. 6 it can be seen that each warp thread 19 undulates between the upper main face 15 and the elementary face 16B, being alternately tangent to one of these faces and then to the other. Each warp thread 19 undulates substantially in a plane $P_{19}$ called the "warp plane," these planes being perpendicular to the main faces 14, 15 in the central zone $R_c$, and perpendicular to the main face 15 and to the elementary faces 16B or 17B in the side regions $R_1$, $R_2$, the warp planes $P_{19}$ being parallel to each other and to the elementary faces $16A_1$, $16A_2$, $17A_1$, $17A_2$, that is to say they are parallel to any plane perpendicular to the main faces 14, 15 and parallel to the length of the lower ply 7, one such plane $\pi_{19}$ being indicated schematically by a straight line in FIG. 3. The planes of FIGS. 5, 6 are for instance warp planes $P_{19}$. In FIG. 3, these warp planes $P_{19}$ are represented by the same continuous lines as the warp threads 19. The average direction $F_{19}$ of the warp threads 19 corresponds to the intersection of the warp planes $P_{19}$ with the upper main face 15 (FIG. 3).

The woof threads 20 undulate substantially in a series of planes $P_{20}$ called the "woof planes" which are parallel to each other and perpendicular to the main faces 14, 15. These woof planes $P_{20}$ form an acute angle $\beta$ of between 0° and 90° with the elementary faces $17A_1$, $17A_2$, the cross section plane of FIG. 4 being, for instance, a woof plane $P_{20}$. These woof planes $P_{20}$ are represented by the same continuous lines as the woof threads 20 in FIG. 3.

In each woof plane $P_{20}$ a woof thread 20 undulates between the warp threads 19 being alternately tangent to one elementary face $16A_1$ or $16A_2$ of the side face 16 and then to another elementary face $17A_1$ or $17A_2$ of the side face 17. The average direction $F_{20}$ of the woof threads 20 is the intersection of the woof planes $P_{20}$ with the main face 15 (FIG. 3).

The woof threads 20 between the side faces 16, 17 are, for instance, substantially rectilinear and parallel to the main faces 14, 15 and in each woof plane $P_{20}$ they move undulating from one main face to the other, for instance from the main face 14 towards the main face 15 and then pass into another adjacent woof plane $P_{20}$ and move in opposite direction, undulating, from the main face 15 towards the main face 14, and so on. The main faces 14, 15 and the elementary faces 16B, 17B parallel to the main faces 14, 15 are defined by warp threads 19.

In the sectional views of FIGS. 5 and 6 it is seen that the woof threads 20 are arranged substantially on several surfaces $N_{20}$, preferably on at least four surfaces in the central region $R_c$ (FIG. 5) and on at least two surfaces in the side regions $R_1$, $R_2$ (FIG. 6). When the woof threads 20 are substantially rectilinear and parallel to the main faces 14, 15 these surfaces $N_{20}$ correspond to planes parallel to the main faces 14, 15, two such planes $N_{20}$ being shown in dashed line in FIGS. 5 and 6. The number of planes $N_{20}$ is for instance seven in the central region $R_c$ and two in the side regions $R_1$, $R_2$. The stiffening threads 9 are formed in the fabric 13 by woof threads arranged substantially in a plane $P_9$ which is parallel to the main faces 14, 15 and located, for instance, near the upper face 15 passing through the side regions $R_1$, $R_2$. This plane $P_9$, which is shown in dashed lines in FIGS. 5, 6, is merged with a plane $N_{20}$. The stiffening threads 9 are without contact with the main faces 14, 15 and they are parallel to the woof planes $P_{20}$, that is to say they form the angle $\beta$ with the face $17A_2$ and each of these stiffening threads 9 extends from one elementary face $16A_2$, $17A_2$, to the other elementary face $17A_2$, $16A_2$, that is to say it passes through the side regions $R_1$, $R_2$. These stiffening threads 9 of the lower ply 7 together form a reinforcing assembly 90 each side end 900 of which is formed by the line joining the adjacent ends of the stiffening threads 9, each line 900 being, for instance, located on a elementary face $16A_2$, $17A_2$.

The stiffening threads 9 are separated from each other by threads 19, 20 of the body 18 in such a manner that these stiffening threads 9 are without contact with each other. In this way the abrading of these stiffening threads 9 against each other is limited.

The structure of the body 18 is therefore three-dimensional since the threads 19, 20 which constitute it are distributed in all three dimensions. This body 18 serves, so to speak, as scaffold for the stiffening threads 9 and it is capable of maintaining a three-dimensional structure even if the stiffening threads 9 are removed from the fabric 13. For clarity in the drawing, a reduced number of threads 9, 19, 20 has been shown in FIGS. 3 to 6.

The lower ply 7 is obtained directly by weaving, without cutting the fabric 13 in the lengthwise direction.

The unit consisting of the fabric 13 can be produced by a single weaving operation, using, for instance, a projectile machine for arranging the stiffening threads 9 in the fabric 13, then cutting the stiffening threads 9 in order to remove therefrom the portions located outside the lower ply 7. Such an operation is easily understood by the man skilled in the art and, for reasons of simplification, this method of weaving is not described in further detail.

It should be noted that other machines could be used for the production of the fabric 13, for instance machines having several shuttles or shuttle-less machines, in particular fluid jet machines. It should be noted also that the stiffening threads 9 could form a continuous woof thread undulating between the faces $16A_2$ and $17A_2$.

The structure of the upper ply 8 is, for instance, similar to that of the lower ply 7 previously described.

The body 18 has the sole purpose of maintaining the stiffening threads 9. The threads 19, 20 constituting this body 18 can therefore be made with very different materials, inorganic, metallic or organic, even if their mechanical properties, in particular their tensile strength, are not very high. For example, each of the threads 19, 20 is made with an organic polymer in order to be of low weight. This organic polymer may, for instance, be rayon, an aromatic or non-aromatic polyamide, a polyester, a polyvinyl alcohol or a polyolefin. It may be advantageous to make the threads 19, 20 of a material compatible with the material with which they are in contact in the tire 1, or identical to said material, these threads 19, 20 being, for instance, made of polyurethane if the tire 1 is obtained by pouring materials capable of reacting with each other to form polyurethanes. It may be advantageous to produce the threads 19, 20 of a thermoplastic material in order to facilitate the welding together of the ends of the fabric 13 by thermal means upon the cutting and abutting of the fabric 13 in order to obtain an endless ply. The stiffening threads 9 must, in their turn, be capable of withstanding the stresses to which the crown 2 is subjected. They must therefore have high mechanical properties, and, in particular, the tensile strength of these threads must be high. These stiffening threads 9 are made, for instance, of a metallic material, in particular steel, an inorganic material, in particular glass, or an organic material, for example in order to decrease the weight and limit the risks of corrosion. This organic material may, for instance, be rayon, an aromatic or a non-aromatic polyamide, a polyester or a polyvinyl alcohol. It goes without saying that the threads 9, 19, 20 may be made of identical or different materials and that each of these threads may comprise several materials with possibly various adjuvants, in particular fillers.

The threads 19, 20 which constitute the body 18 preferably have a cross section the surface of which has a smaller area than the area of the surface of the cross section of the stiffening threads 9 so that the contribution of these threads 19, 20 to the stiffening of the ply 7 or 8 is as small as possible. The threads 19, 20 advantageously have a cross section the surface of which has an area at most equal to one-quarter of the area of the surface of the cross section of the stiffening threads 9. Under these conditions, when the threads 9, 19, 20 have a cylindrical shape of circular cross section, the diameter of the threads 19, 20 is preferably less than the diameter of the stiffening threads 9 and the diameter of the threads 19, 20 is advantageously at most equal to one-half of the diameter of the stiffening threads 9.

By way of example, the tire 1 is produced by casting fluid or pasty materials capable of producing a polyurethane by reaction, this production taking place in accordance with a single-step process.

Figure 7:
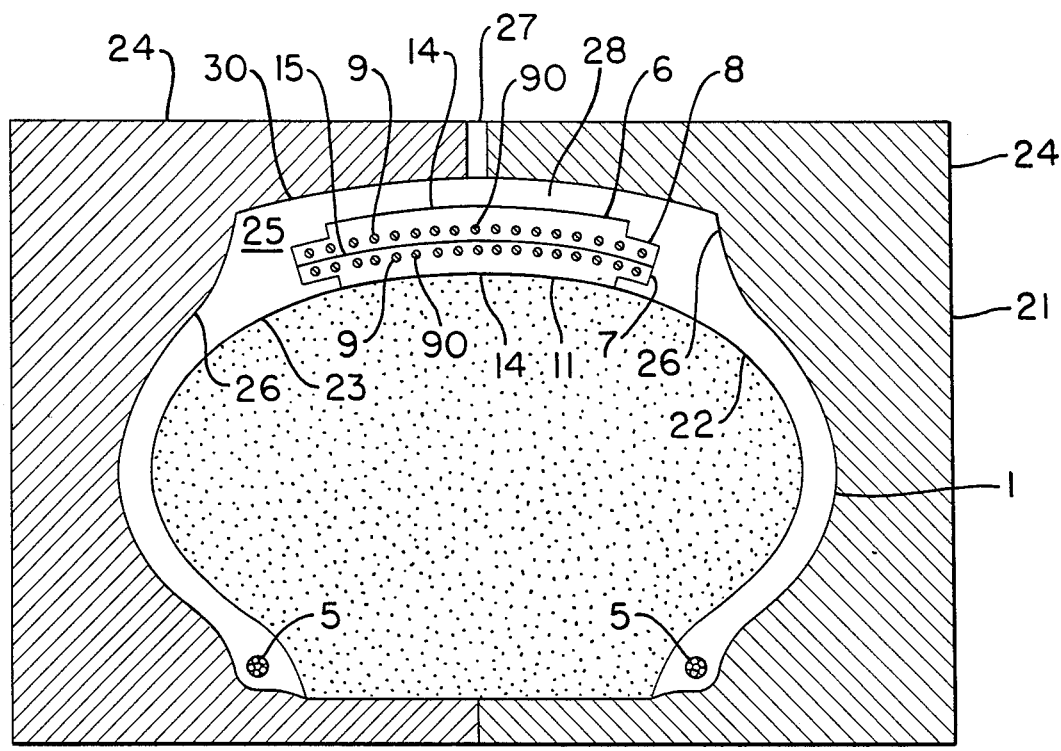
FIG. 7 shows in radial section a portion of a mold used for the production of the tire shown in FIG. 1.

This process employs a mold 21 shown in part in FIG. 7. The lower ply 7 which had a flat shape with two ends is previously brought into the shape of a ring, for instance by providing its ends end to end, and after this welding, the warp threads 19 are substantially arranged in warp planes $P_{19}$ parallel to the edges of the endless lower ply 7 thus obtained. Upon the butt assembling of the ends of this lower ply 7, it is important that two successive stiffening threads 9 be separated by a substantially constant distance over the entire resultant ring, including at the place of the abutting of the ends.

After butting, the outer face of this ring consists of the upper face 15 and the inner face of the ring consists of the lower face 14, this lower face 14 being narrower than the upper face 15, as previously described.

The upper ply 8 is also brought into the shape of a ring by butting its ends, but the arrangement of this endless upper ply 8 is opposite that of the lower ply 7, that is to say the outer face of this ring 8 is formed by the face 14 and the inner face of this ring 8 is formed by the face 15, the inner face 15 of the ring 8 being therefore wider than the outer face 14 of this ring and constituting a lower main face while the outer face 14 of this ring 8 constitutes an upper main face.

The lower ply 7 is placed on the core 22 of the mold 21 in such a manner that the narrow lower face 14 of this ply 7 is directly in contact with the convex face 23 of the core 22. The upper ply 8 is placed on the lower ply 7, that is to say the wide faces 15 of these two plies are directly in contact with each other, the narrow face 14 of the upper ply 8 therefore having the largest radial distance in the stiffening reinforcement 6 thus obtained. The two shells 24 of the mold 21 are then closed around the core 22 so as to obtain a cavity 25 defined by the convex face 23 of the core 22 and the concave faces 26 of the shells 24. The stiffening reinforcement 6 is thus arranged in this cavity 25 as well as the bead rings 5 which have been previously fastened in the mold 21 by known means before the closing of the shells 24. This cavity 25 has, for instance, the same shape as the finished tire 1. A mixture which forms in the mold a polyurethane 28 is then introduced into the cavity 25 through the conduit 27, in known manner. By definition, the voids 29 in the fabrics 13 are voids between the threads 9, 19, 20 of these fabrics (FIGS. 3, 4) and practically all these voids 29 are capable of being filled with material 28 in the case of the plies 7, 8. The arrival of the mixture in the cavity 25 takes place, for instance, under vacuum, but other production techniques are possible, for instance centrifuging techniques. The entire tire 1 is thus obtained by this pouring.

For purposes of simplification, the other parts of the mold 21 as well as the means for fastening the bead rings 5 in the mold 21 have not been shown in the drawing. The lower face 14 of the lower ply 7 therefore in part constitutes the inner face 11 of the tire 1 and the material 28 which covers the stiffening reinforcement 6 constitutes the tread 30 of the tire 1.

When the plies 7, 8 are incorporated into the tire 1, each of these plies has the following properties in the vicinity of the equatorial plane zz' of the tire 1.

The warp threads 19 undulate substantially in planes parallel to the equatorial plane zz';

the woof threads 20 and the stiffening threads 9 are substantially arranged in cylinders of revolution whose axis is the axis of revolution yy' of the tire 1, the threads 9, 20 of each of the plies 7, 8 forming the angle $\alpha_7$ or $\alpha_8$ with the equatorial plane zz', said angles being substantially equal to 23° and of opposite direction in the example described, the number of cylinders of the woof threads 20 being seven, each of these cylinders corresponding to a previously defined level $N_{20}$;

the side faces 16, 17 of the plies 7, 8 form the side faces of these plies in the tire 1, the elementary faces $16A_2$, $17A_2$ being further from the equatorial plane zz' than the elementary faces $16A_1$, $17A_1$, these faces $16A_1$, $16A_2$, $17A_1$, $17A_2$ having slightly frustoconical shapes, the apices of these cones, not shown in the drawing for purposes of simplification, being located on the axis of revolution yy'. In the tire 1, the stiffening threads 9 of each ply 7, 8 are substantially arranged on a surface $C_9$, these two surfaces $C_9$ being represented by dashed lines in FIG. 1.

The invention has the following advantages:

(1) Each ply 7, 8 is very easy to arrange in the mold 21 since it is sufficient to place it for instance on the core 22. The three-dimensional body 18 of each ply 7, 8 assures the accurate positioning in space of the stiffening threads 9 within the tire 1, since it assures:

correct positioning of the stiffening threads 9 with respect to each other;

correct positioning of the assembly 90 of the stiffening threads 9 with respect to the face 23 of the core 22 or with respect to any other part of the mold 21 with which the body 18 is in contact.

(2) The correct positioning of the stiffening threads 9 permits the construction of pneumatic tires of a very uniform quality of manufacture, substantially without danger of deterioration as a result of displacements of these stiffening threads 9 during the course of manufacture.

(3) Since for each ply 7, 8, the body 18 which holds the stiffening threads 9 has a three-dimensional structure with a large number of threads 19, 20, this body 18 introduces practically no heterogeneity into the tire 1. This tire thus has a symmetry of revolution which is substantially perfect, without the body 18 causing harmful vibratory phenomena. Furthermore, there is a very good connection between the stiffening reinforcement 6 and the material 28 with which it is in contact, so that this tire is characterized by satisfactory comfort and life.

(4) The plies 7, 8 may be made light weight by, for instance, making all the threads 9, 19, 20 of organic polymers, which furthermore have the advantage of limiting the danger of corrosion.

(5) The permeability of the side faces 16, 17 is large in the directions perpendicular to their elementary faces $16A_1$, $16A_2$, $16B$, $17A_1$, $17A_2$, $17B$ due to the thinning of the fabric 13 in the side regions $R_1$, $R_2$, which thinning increases the contact surfaces between the faces 16, 17 and the material 28.

(6) The thinning of the lower ply 7 in the side regions $R_1$, $R_2$ makes it possible to limit the danger of deterioration on the inner face 11 of the tire 1. The explanation of this phenomenon is as follows: Each side end 900 of this lower ply 7 behaves, so to speak, as an articulation for the sidewall 3 located on the same side as said side end 900 with respect to the equatorial plane zz' of the tire 1, the side ends 900 being the points of the reinforcing assembly 90 which are furthest from the equatorial plane zz'. In the radial plane of FIG. 1, the points of the tire 1 which are located both on the inner face 11 and on straight lines which are perpendicular to the surfaces $C_9$, and pass through the side ends 900 are subjected to particularly high tensile stresses as the result of the articulation previously described. One such point $P_1$ is shown in FIG. 1, this point $P_1$ being located on the inner face 11, on a line $D_1$ which is perpendicular to the surface $C_9$ of the lower ply 7 and passes through one side end 900 of this lower ply 7, the point $P_1$ being located on the same side as the side face 16 of the lower ply 7 with respect to the equatorial plane zz'. The radial plane of FIG. 1, passing through point $P_1$, intersects in the lower ply 7 the lower main face 14 and the side face 16 along two traces, not provided with reference numbers in the drawing in order not to clutter it, these traces meeting at the point M which is therefore, within this radial plane, for the lower ply 7, the end of the lower main face 14 located on the same side as the point $P_1$ with respect to the equatorial plane zz'. It can be seen that due to the thinning of the lower ply 7, the point $P_1$ is located at a substantial distance from the point M, that is to say at a substantial distance from the interface I between the side face 16 of the lower ply 7 and the material 28 outside this face, in the vicinity of the lower main face 14 of the lower ply 7. The distance between the points $P_1$ and M is preferably at least equal to one-half of the maximum thickness E of the lower ply 7, measured in its central region $R_c$ between the main faces 14, 15 in the tire 1, in the equatorial plane zz' or near this equatorial plane. The same is true in the vicinity of the other end 900 of the assembly 90 of the lower ply 7 on the other side of the equatorial plane zz'. The deformation of the lower ply 7 in the tire 1 is slight also when the lower ply 7 is so arranged that it has a generally flat shape and, when it is intersected by a plane which is perpendicular both to the main faces 14, 15 and to the warp planes $P_{19}$, that is to say perpendicular to the length of the lower ply 7, one obtains a section such that, on it, the difference between, on the one hand, the distance between the ends 900 (that is to say the width of the assembly 90) and, on the other hand, the length of the trace of the lower face 14 (that is to say, the width of the narrow lower face 14) is at least equal to E, E having substantially the same value when the lower ply 7 has a generally flat shape as when it is arranged in the tire 1. The width of the assembly 90, indicated as $Z_{90}$, which width is the same as that of the lower ply 7, and the width of the lower face 14, bearing the reference number $Z_{14}$, are shown in FIG. 3.

The good distribution of the stresses obtained in the lower part of the crown 2 due to the thinning of this lower ply 7 remains when the lower main face 14 of the lower ply 7 is close to the inner face 11 without being part thereof, in particular when the distance between the faces 11 and 14 is at most equal to H/5, H being the thickness of the crown 2 measured in the equatorial plane zz' or in the vicinity of this plane, the distance between the faces 11, 14 being also measured in this equatorial plane or near this plane.

The thinning of the upper ply 8 can also make it possible to decrease the risk of deterioration in the upper part of the crown 2 when the narrow face 14 of this upper ply 8 is close to the surface of travel 300 for the same reasons as those previously described, in particular when the distance between the face 14 and the travel surface 300 is at most equal to H/5.

The lower ply 7 has been made in such a manner that its stiffening threads 9 are without contact with the main faces 14, 15 of this lower ply 7, but one can contemplate cases in which the stiffening threads 9 in this lower ply 7 would be in contact with the upper main face 15 while being without contact with the narrow face 14.

Figure 8:
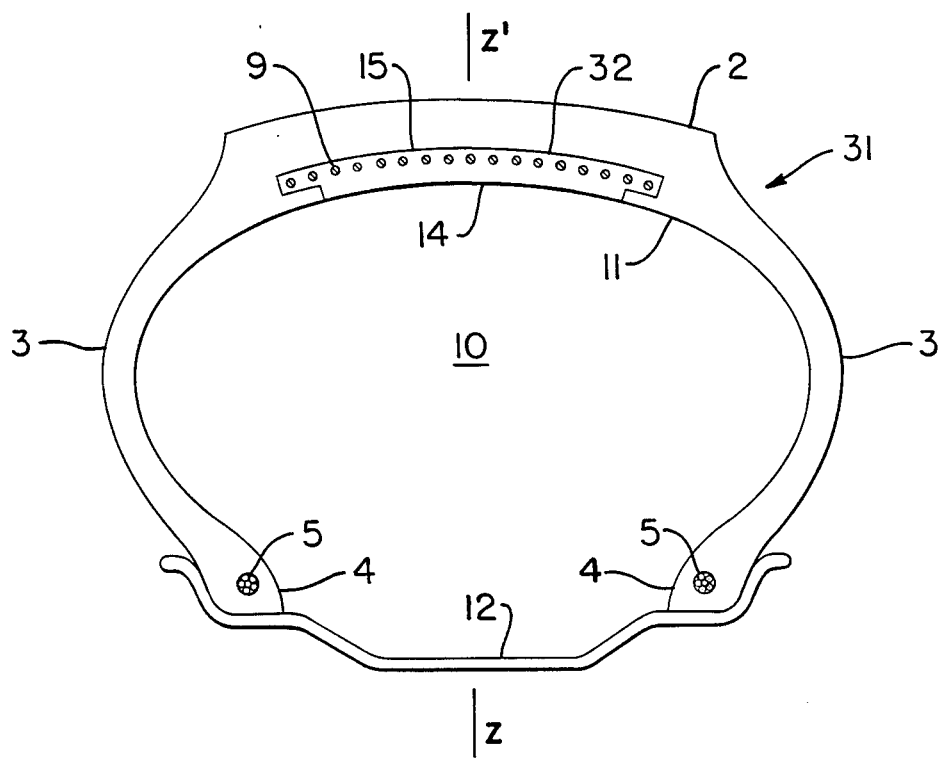
FIG. 8 shows in radial section a pneumatic tire having a crown reinforcement formed of another stiffening ply according to the invention.
Figure 9:
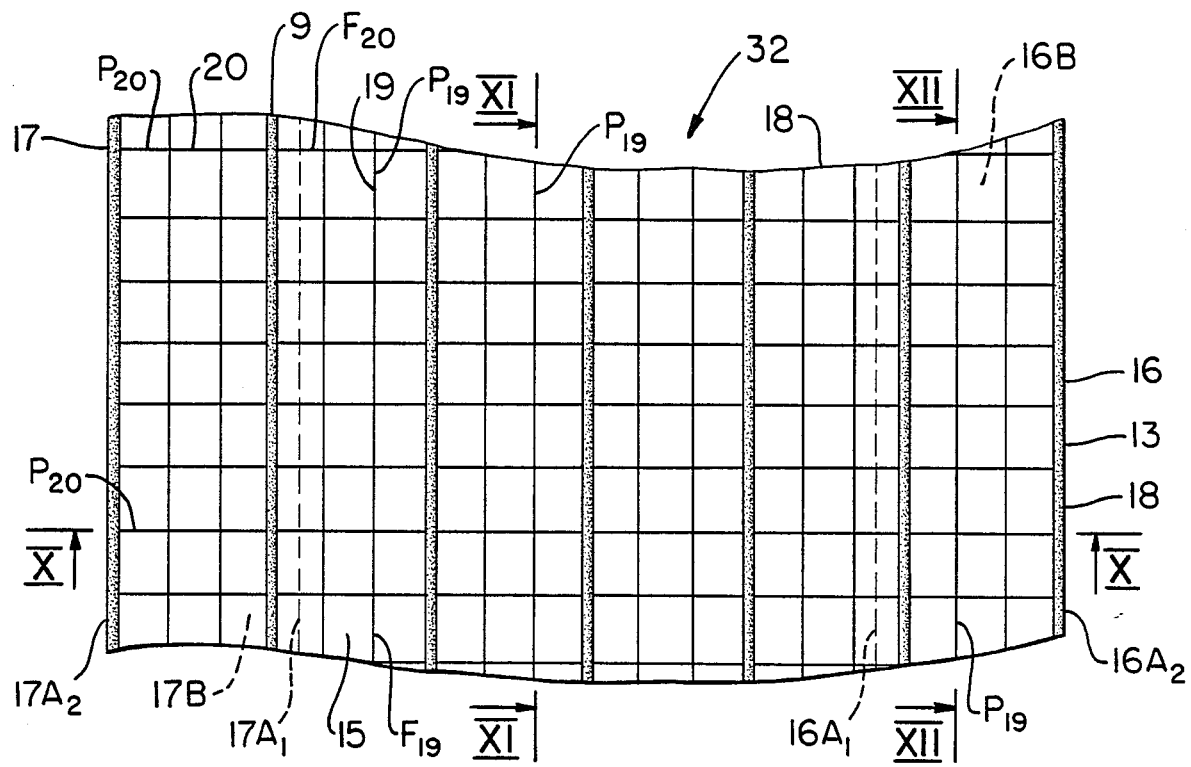
FIG. 9 shows, in top view, a portion of the stiffening ply shown in FIG. 8.

FIG. 8 shows a tire 31 having another stiffening ply in accordance with the invention. This stiffening ply 32 occupies, for instance, the same place as the lower ply 7 in the crown 2 of the tire 1. A portion of this stiffening ply 32 is shown in top view in FIG. 9, this stiffening ply 32 then having a generally flat shape, with main faces 14, 15 which are substantially flat and parallel, that is to say it is shown in FIG. 9 before it has been incorporated in the tire 31. This ply 32 differs from the plies 7, 8 previously described by the fact that the fabric 13 has substantially the following characteristics: Within the body 18 the woof threads 20 are arranged in woof planes $P_{20}$ which are perpendicular to the warp planes $P_{19}$ of the warp threads 19. The stiffening threads 9 are parallel to each other and arranged in a plane $P_9$ (shown in dashed line in FIG. 10) parallel to the main faces 14, 15, these threads 9 being parallel to the warp planes $P_{19}$ and therefore constituting warp threads of the fabric 13.

In a manner similar to FIGS. 4, 5 and 6, FIG. 10 is a section through the portion of ply 32 along a plane intersecting the main faces 14, 15 and the side faces 16, 17 of the fabric 13, this plane being perpendicular to the main faces 14, 15 and indicated schematically by the straight line X—X in FIG. 9; FIG. 11 is a section through the portion of ply 32 in the central region $R_c$ along a plane perpendicular to the main faces 14, 15 and parallel to the elementary faces $16A_1$, $16A_2$ $17A_1$, $17A_2$, this plane being indicated schematically by the straight line XI—XI in FIGS. 9, 10; and FIG. 12 is a section through the portion of ply 32 in the side region $R_1$ of said portion along a plane perpendicular to the main face 15 and to the elementary face 16B, the plane of FIG. 12 being parallel to the elementary faces $16A_1$, $16A_2$, $17A_1$, $17A_2$, this plane being indicated schematically by the straight line XII—XII in FIGS. 9 and 10. The plane of FIG. 10 corresponds to a woof plane $P_{20}$, and each of the planes of FIGS. 11, 12 corresponds to a warp plane $P_{19}$.

Figure 10:
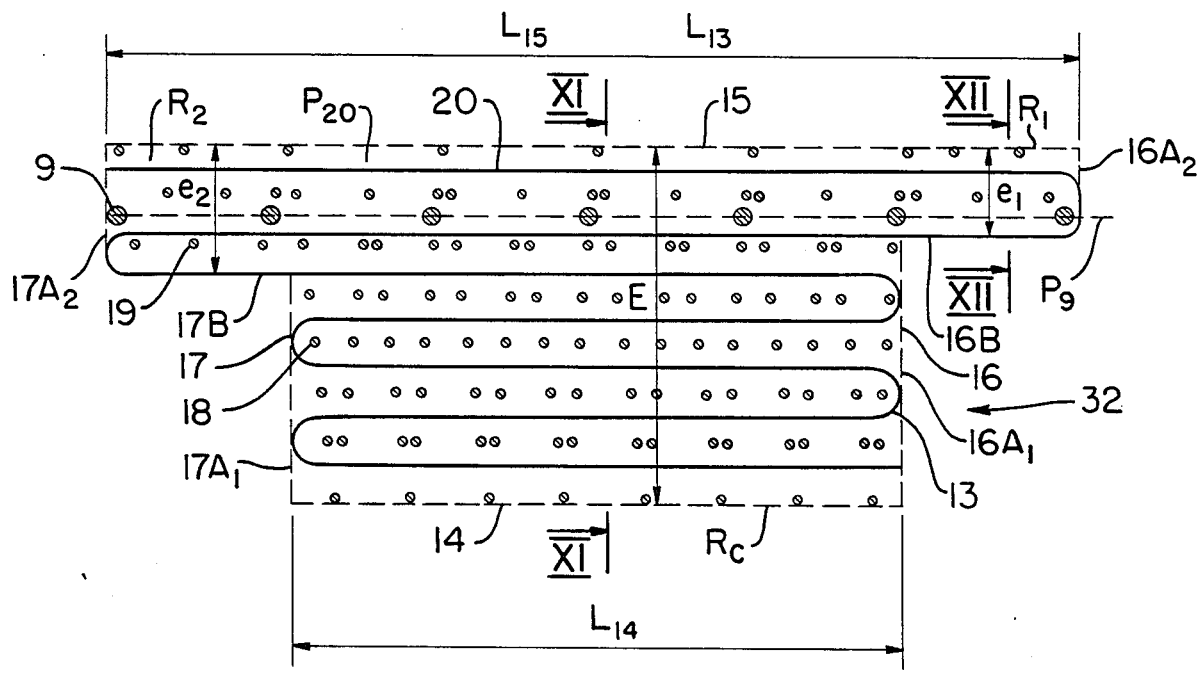
FIG. 10 shows in cross section the ply shown in part in FIG. 9, this section being taken along the line X—X of FIG. 9.
Figure 11:
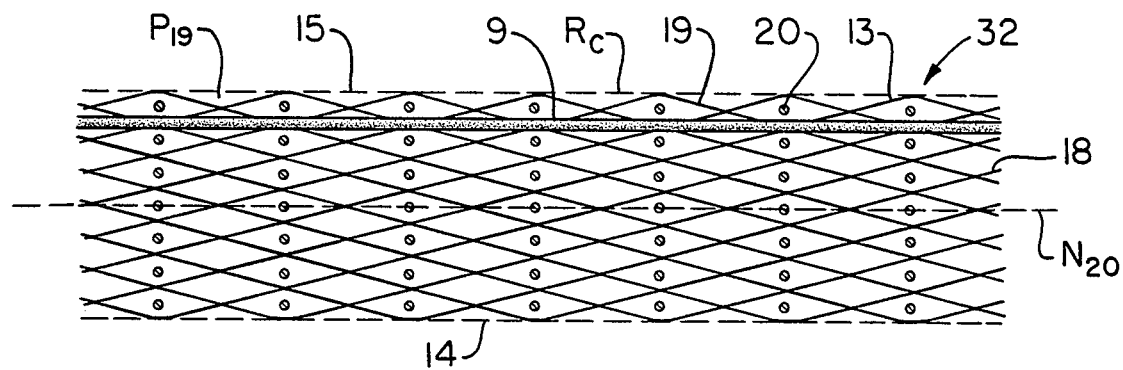
FIG. 11 shows, in cross section, a portion of the ply shown in FIGS. 9 and 10, this section being taken in the central region of the ply, along the lines XI—XI of FIGS. 9 and 10.
Figure 12:
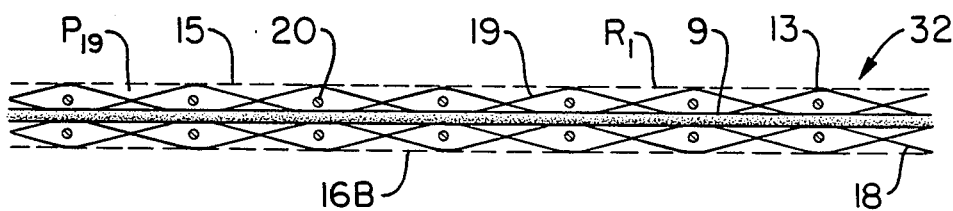
FIG. 12 shows in cross section a portion of the ply shown in FIGS. 9 and 10, this section being taken in a side region of the ply, along the lines XII—XII of FIGS. 9 and 10.

In FIGS. 10, 11, 12, the undulations of the warp threads 19 and of the woof threads 20 are similar to those previously described for the plies 7, 8, with the difference that the warp planes $P_{19}$ and the woof planes $P_{20}$ are perpendicular to each other.

The tire 31 is, for instance, of size 135-13 and it is made by molding in a manner similar to the tire 1, by forming a ring with the ply 32 and arranging this annular ply on the core 22, the narrow lower face 14 of this ply 32 being placed directly in contact with the convex face 23 of the core 22 so that the face 14 constitutes a part of the inner face 11 of the tire 31.

The stiffening ply 32 has the following properties:

(a) Geometrical dimensions:

the thicknesses $e_1$, $e_2$ are substantially equal to 1.1 mm;

the total thickness E is substantially equal to 2 mm;

the length $L_{14}$ is substantially equal to 75 mm;

the length $L_{15}$ is substantially equal to 85 mm.

The reference letters $e_1$, $e_2$, E, $L_{14}$, $L_{15}$ have the same meaning as previously defined for the ply 7, with the difference that the woof plane $P_{20}$ where they are measured is perpendicular in the case of the ply 32 to the warp planes $P_{19}$.

(b) Nature and arrangement of the threads 19, 20 of the body 18:

The warp threads 19 and the woof threads 20 all have a cable structure formed of two yarns of 10 tex twisted 1000 turns per meter Z, these two yarns being then assembled and twisted together with 1000 turns per meter S to form the cable. The material of these cables 19, 20 is a thermoplastic polyester stabilized at 130° C. For each of these cables, the rupture force is 7N, the elongation at rupture 26% and the diameter 0.15 mm.

The body 18 has 665 warp cables 19 per 100 millimeters and 760 woof cables 20 per 100 millimeters. The counting of the cables 19, 20 is effected over the entire thickness E, that is to say in the central region $R_c$, in a plane perpendicular to the main faces 14, 15, this plane being a woof plane $P_{20}$ for the counting of the warp cables 19 and this plane being a warp plane $P_{19}$ for the counting of the woof cables 20, the distance of 100 mm being measured along the intersection of the plane in question with a main face 14, 15. For clarity in the drawing, a reduced number of cables 19, 20 has been shown in FIGS. 9 to 12.

The number of levels $N_{20}$ is seven for the central region $R_c$ and two for each side region $R_1$, $R_2$. The definition of the levels $N_{20}$ is the same as that given previously for the ply 7, one such level $N_{20}$ being shown in dashed line in FIG. 11.

(c) Nature and arrangement of the stiffening threads 9:

Each of the stiffening threads 9 has a cable structure formed of two yarns of 167 tex twisted 314 turns per meter Z, these two yarns being then assembled and twisted together with 314 turns per meter S to produce the cables 9. The material of these cables 9 is an aromatic polyamide. For each of these cables 9, the rupture strength is 57 daN, the elongation at rupture 5.2%, and the diameter 0.7 mm. The number of these cables 9, measured in a woof plane $P_{20}$, is 48 for a distance of 100 mm measured on a straight line of this plane passing through the axes of these cables. For clarity in the drawing, a reduced number of stiffening cables 9 has been shown in FIGS. 8 to 12.

(d) Rigidity of the fabric 13 and of the body 18:

One measures the rigidity of the fabric 13 with the body and the stiffening cable 9, on the one hand, and the rigidity of the body 18 alone, on the other hand. Each of these rigidities is measured, on the one hand, along the average direction $F_{19}$ of the warp cables 19, this direction $F_{19}$ being parallel to the stiffening cables 9—this rigidity is then called the "warp rigidity"—and, on the other hand, along the average direction $F_{20}$ of the woof cables 20, this direction $F_{20}$ being parallel to the main faces 14, 15 and perpendicular to the warp planes $P_{19}$, this rigidity being then called the "woof rigidity." In FIG. 9, the references 19, $F_{19}$ and $P_{19}$ are represented by the same straight lines and the references 20, $F_{20}$ and $P_{20}$ are represented by the same straight lines.

In each case, the rigidity corresponds to the ratio $F/L\epsilon$, F being the force necessary to obtain a fixed relative elongation $\epsilon$ which is equal in all cases to 2%, and L being the width of the fabric 13 or of the body 18 subjected to this measurement, this width being measured along a main face 14, 15 and perpendicular to the orientation on which the force F acts, that is to say perpendicular to the direction $F_{19}$ or to the direction $F_{20}$. This width is, for instance, equal to 100 mm, the ratio $F/L\epsilon$ being substantially independent of the value L when the numbers of cables 9, 19, 20 corresponding to this value L are large, which is true in the case of the ply 32. These rigidity measurements are carried out in the central region $R_c$.

The rigidity values are as follows:
Fabric 13:
warp rigidity: 2400 kN/m; woof rigidity: 78 kN/m
Body 18:
warp rigidity: 70 kN/m; woof rigidity: 78 kN/m.

Preferably, the ratio in the ply 32 between, on the one hand, the rigidity of the fabric 13 measured along the direction of the stiffening threads 9 and, on the other hand, the rigidity of the body 18 alone measured along this same direction is at least equal to 10, and preferably at least equal to 30, and this whatever the structure of the threads 9, 19, 20, so that the stiffening effect is due substantially only to the stiffening threads 9. Thus in the example cited for the ply 32, the ratio of the warp rigidity of the fabric 13 to the warp rigidity of the body 18 is substantially equal to 34.

When the fabric 13 and the body 18 are impregnated with a polyurethane rubber of a modulus of 40 MPa, the rigidity values are as follows, these rigidities being measured in the same way as previously defined: Impregnated fabric 13:
warp rigidity: 2510 kN/m; woof rigidity: 463 kN/m;
Impregnated body 18:
warp rigidity: 550 kN/m; woof rigidity: 552 kN/m.

All the geometrical properties previously defined for the stiffening ply 32 refer to a stiffening ply before incorporation in the tire 31, this ply 32 being then arranged in such a manner that the main faces 14, 15 are flat and parallel, as previously described.

When the ply 32 is incorporated in the tire 31, it has the following properties in the vicinity of the equatorial plane zz' of the tire 31:

the warp cables 19 undulate in planes which are substantially parallel to the equatorial plane zz';

the stiffening cables 9 are arranged substantially in a cylinder of revolution whose axis is the axis of revolution of the tire 31, these stiffening cables 9 being parallel to the equatorial plane zz', that is to say they have a lengthwise orientation;

the woof cables 20 are arranged substantially in seven cylinders of revolution whose axis is the axis of revolution of the tire 31, these cables 20 being perpendicular to the equatorial plane zz';

the side faces 16, 17 form the side faces of the ply 32 in the tire 31.

The advantages presented by the ply 32 are the same as those previously described in the case of the plies 7, 8.

The tire 31 could comprise a plurality of superimposed plies 32, for instance by winding this ply on itself before the tire is made.

The ply 32 can be made directly by weaving in the form of a ribbon which is cut to the desired length. This ply 32 can also be made by cutting from a strip of fabric, as shown in FIG. 13, the cutting making it possible to obtain the side faces 16, 17.

Figure 13:
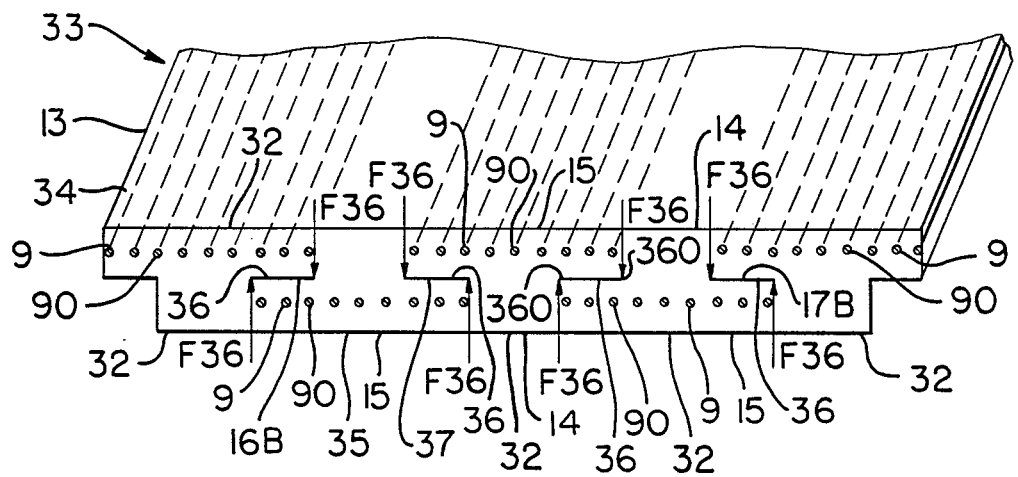
FIG. 13 shows, in profile view, a strip of fabric from which several plies according to the invention can be prepared by cutting.

In this FIG. 13 there can be noted a strip 33 of fabric 13, the weaving of this strip having been effected in a single operation. In this strip 33, the stiffening threads 9 parallel to each other constitute reinforcing assemblies 90, these assemblies 90 being located alternately in the vicinity of one main face 34 of the strip 33 and then in the vicinity of the other main face 35 of the strip 33.

The successive assemblies 90 overlap in part, being separated by a pocket 36 provided in the strip 33 upon the weaving. These pockets 36 which have the entire length of the fabric in the direction of the threads 9, have main faces 37 which are parallel to the main faces 34, 35. After weaving, it is sufficient to cut out the strip 33 perpendicular to the main faces 34, 35 and parallel to the threads 9 in order to arrive at the ends 360 of the pockets 36, these ends being parallel to the threads 9. The cutting is indicated schematically by the arrows $F_{36}$ in FIG. 13, this cutting being such that, after cutting, the strip 33 consists of a succession of plies 32 arranged face to face in head-tail manner, the main faces 37 of the pockets 36 constituting elementary faces 16B, 17B, each main face 34, 35 becoming alternately main face 14 and then 15. In these plies 32, the elementary faces $16A_1$, $16A_2$, $17A_1$, $17A_2$ are obtained by the cuts $F_{36}$. One can thus obtain several plies according to the invention from a single weaving operation, which makes it possible to decrease the expense. The cutting along the arrows $F_{36}$ can be effected by any suitable means, for instance with a heated wire if the threads of the body 18 are of thermoplastic material.

The invention covers cases in which the narrowing between the main faces 14, 15 takes place in several steps on the side faces 16, 17. Thus, FIG. 14 is a section through a ply 40 according to the invention, this section being taken in a manner similar to those of FIGS. 4, 10.

The side face 16 has three elementary faces $16A_1$, $16A_2$, $16A_3$ which are parallel to each other and perpendicular to the main faces 14, 15, the faces $16A_1$, $16A_2$ being connected by the elementary face $16B_1$ and the faces $16A_2$, $16A_3$ being connected by the elementary face $16B_2$, like the steps of a staircase, these faces $16B_1$, $16B_2$ being parallel to the main faces 14, 15. The side face 17 also has the elementary faces $17A_1$, $17A_2$, $17A_3$, $17B_1$, $17B_2$ whose arrangement is similar to that of the elementary faces of the side face 16. The narrowing of the lower face 14 with respect to the upper face 15 is therefore effected in two steps, which favors a better distribution of the stresses in the article using this ply.

One can also contemplate cases in which the side faces 16, 17 are continuous and oblique as in the ply 50 shown in cross section in FIG. 15, this cross section being taken in a manner similar to the cross sections of FIGS 4 and 10. The ply 50 has in this case a trapezoidal section. This ply 50 has the advantage of uniform shape but its production by weaving requires more complicated machines than in the cases previously described.

FIG. 16 shows, in radial section, a portion of the crown 2 of the pneumatic tire 60 having another crown stiffening ply 61 in accordance with the invention.

This ply 61 has a lower main face 62 constituting, in part, the inner face 11 of the tire 60 and an upper main face 63 located on the inside of the crown 2. In the radial plane of FIG. 16, the trace 630 of the upper face 63 has a length substantially less than the length of the trace 620 of the lower face 62, this latter length being substantially equal to the width of the section $S_{61}$ of the ply 61 through this radial plane. The stiffening assembly 90 of the stiffening threads 9 is arranged substantially on a surface $C_9$ shown in a dashed line in FIG. 16 and arranged in the vicinity of the upper face 63, in the central region $R_c$. The straight line $D_1$ passing through a side end 900 of this assembly 90 is perpendicular to the surface $C_9$ and intersects the face 11 at the point $P_1$. This point $P_1$ is subjected to high tensile stresses as a result of the articulation of the crown 2 at the end 900, but it is located within the ply 61 at a substantial distance from the side face 64 of the ply 61, this side face 64 being located on the same side as point $P_1$ with respect to the equatorial plane zz′ and terminating at the inner face 11. Therefore, the point $P_1$ is located at a substantial distance from the interface I between the side face 64 and the material of the crown 2 on the outside of the side face 64, in the vicinity of the lower main face 62, which assures a good distrubution of stresses around the point $P_1$, avoiding the risk of separation between the ply 61 and the rest of the crown 2. The stiffening ply 61 provides the same advantages as the ply 7, but it has the drawback of using a larger amount of fabric 13.

FIG. 17 shows, in radial section, a portion of the crown 2 of a pneumatic tire 70 having another crown stiffening ply 71 according to the invention. This ply 71 has a lower main face 72 which constitutes, in part, the lower face 11 of the tire 70 and an upper main face 73 which constitutes in part the travel surface 300 of this tire 70. In the radial plane of FIG. 17, the trace of the face 72 is marked 720 and the trace of the face 73 is marked 730. The length of each of these traces 720, 730 is substantially less than the width of the section $S_{71}$ of the ply 71 along the radial plane, these main faces 72, 73 being both "narrow faces." The reinforcing assembly 90 of stiffening threads 9 is arranged in the widest portion of the ply 71, substantially on the surface $C_9$ shown in dashed line in FIG. 17 and occupies substantially the entire width of the section $S_{71}$. The straight line D passing through a side end 900 of this assembly 90 is perpendicular to the surface $C_9$, and intersects the face 11 at the point $P_1$ and the travel surface 300 at the point $P_2$. The inner face 11 and the travel surface 300 are called "faces of the crown 2." These points $P_1$, $P_2$ are subjected to high tensile stresses as a result of the articulation of the crown 2 at the end 900, but each of these points $P_1$, $P_2$ is outside the ply 71 at a substantial distance from the ply 71, with the resultant advantages which have been previously described.

In the tires 60, 70 the distance, in a radial plane, from each point $P_1$, $P_2$ to the end M of the main face 62, 72, 73 which constitutes in part the face of the crown 11, 300 where this point $P_1$, $P_2$, is located is greater than half of the maximum thickness E of the ply 61, 71, this end M being located on the same side as this point $P_1$, $P_2$ with respect to the equatorial plane zz′ of the corresponding tire 60, 70.

When each ply 61, 71 is arranged in such a manner as to have a generally flat shape with flat and parallel main faces, every plane which intersects the main and side faces of the fabric, this plane being perpendicular to the length of the fabric and to the main faces of the fabric, gives a cross section such that the difference in absolute value between, on the one hand, the width of the reinforcing assembly 90 (that is to say, the distance between the side ends 900) and, on the other hand, one of the maximum or minimum widths of the cross section is at least equal to the maximum thickness E of the ply.

In the plies according to the invention, it is possible to arrange the stiffening threads on several planes in the thickness of the plies. In such a ply, it may be useful for the stiffening threads 9 to be biased from one plane to the other, these threads being parallel to each other in each plane, for instance in order to produce the assembly of the crown reinforcement with this ply. Such a ply may be of such a nature, for instance, that the stiffening threads are arranged in two planes, the stiffening threads being directed along the warp threads in one plane and along the woof threads in the other plane.

It goes without saying, furthermore, that the plies in accordance with the invention can be combined with known stiffening plies.

The invention furthermore covers cases in which at least one of the following features is used:

(1) The permeability of the fabric 13 is preferably at least equal to $10^{-11}$ $m^2.Pa^{-1}.s^{-1}$. This permeability is measured by causing the fabric 13 to be passed through by a fluid the density of which is equal to 1000 kg/m$^3$ and the dynamic viscosity of which is equal to 1 Pa.s. The permeability represents the ratio between the speed of laminar flow of the fluid and the pressure gradient which causes this flow.

This permeability is preferably greater than $500 \times 10^{-11}$ $m^2.Pa^{-1}.s^{-1}$.

(2) The fabric 13 has a porosity of at least 50%, this porosity varying preferably from 70% to 90%; this porosity, determined by calculation, is equal to the ratio v/V, "v" being the void volume of the fabric and V the total volume of the fabric, that is to say the sum of the void volume "v" and of the volume occupied by the threads 9, 19, 20.

The permeability and the porosity of the fabric 13 are determined in the central region $R_c$ of the fabric 13 when this fabric is arranged in such a manner as to have a generally flat shape. These figures vary slightly upon the use of the fabric 13 to produce the tire, that is to say when this fabric 13 is no longer flat. The above-mentioned figures permit good impregnation of the fabric 13 by the material 28.

(3) The stiffening threads 9 can be arranged in the fabric 13 in such a manner that they undulate slightly, for instance in the plane $P_9$. Such an undulating thread 9 is shown in FIG. 18. The rate of undulation T of these threads 9 is for instance less than 10%, the rate T being defined by the relationship $T=a/p$ in which "a" is the amplitude of the undulation measured between two successive peaks 80 of the thread 9 and "p" is the wavelength of this undulation; the orientation of each undulated thread 9 is then represented by its average orientation when the fabric 13 is arranged in such a manner as to have a generally flat shape.

(4) The ratio between, on the one hand, the rigidty of the fabric 13 measured along each orientation of the stiffening threads 9 and, on the other hand, the rigidity of the body 18 alone measured along this orientation is at least equal to 10 and preferably at least equal to 30, the fabric being, for this measurement, without stiffening threads of orientation other than that along which the rigidity is measured; the rigidity corresponds in each case to the ratio $F/L_\epsilon$, F being the force necessary to obtain a fixed relative elongation $\epsilon$ which is equal in all cases to 2% and L being the width of the fabric 13 or of the body 18 subjected to this measurement, this width being measured along the main faces 14, 15 perpendicular to the direction of application of the force, the ratio $F/L_\epsilon$ being substantially independent of the value L when the numbers of the threads 9, 19, 20 corresponding to this value L are large.

(5) The stiffening threads of the same ply can be formed of different materials, whether there are one or more orientations for these threads; thus, for instance, the stiffening threads 9 corresponding to one orientation may be metallic and the stiffening threads 9 corresponding to another orientation may be made of an organic material, in particular aromatic polyamide.

(6) The stiffening plies according to the invention can be used for pneumatic tires the manner of manufacture of which is other than casting. Thus, for example, these plies can be used to produce pneumatic tires by building on a drum, in particular by arranging the plies according to the invention either directly on the drum so that they constitute at least in part a face of the tires, the stiffening threads being without contact with said face, or on a thin layer of rubber. In this case, it may be advantageous to impregnate the plies with a rubber before incorporating them in the tires.

(7) It is possible to use in one and the same tire several plies according to the invention such that in a radial plane the stiffening assemblies 90 have different widths.

(8) The plies according to the invention can be such that when they are arranged in such manner as to have a generally flat shape, the main faces are substantially flat and parallel and every plane intersecting the main and side faces of the fabric 13 forms a cross section such that the lengths of the traces of the two main faces are equal to each other and equal to the maximum widths of this cross section, none of these main faces therefore being a "narrow face."

(9) The plies according to the invention can be used to stiffen parts of a pneumatic tire other than the crown, for instance the beads.

The invention is, of course, not limited to the embodiments which have been described above.

I claim:

1. A finished pneumatic tire comprising at least one stiffening ply, characterized by the fact that the ply is formed at least in part of a fabric having the following properties:
   (a) the fabric has a three-dimensional body and stiffening threads arranged in the body and held by the body; the body is a woven body formed of warp threads and woof threads;
   (b) substantially all the voids in the fabric are filled by at least one material which forms part of the structure of the tire;
   (c) the fabric has two main faces connected by two side faces;
   (d) when the fabric is arranged in such a manner as to have a generally flat shape, the main faces are substantially flat and parallel and every plane intersecting the main and side faces of the fabric through the entire thickness of said fabric forms a cross section the width of which, measured parallel to the main faces, varies from one main face to the other;
   (e) the body is capable of maintaining a three-dimensional structure even if the stiffening threads are removed from the fabric;
   (f) the stiffening threads are separated from each other by threads of the body so that the stiffening threads are without contact with each other, and the stiffening threads are without contact with at least one main face.

2. A finished pneumatic tire according to claim 1, characterized by the fact that the ply has a central region and two side regions, the thickness of the ply in the central region being greater than the thickness of the ply in the side regions, these thicknesses being measured along straight lines perpendicular to any plane which is parallel to the main faces when the fabric is arranged in such a manner as to have a generally flat shape.

3. A finished pneumatic tire according to claim 1, characterized by the fact that each of the warp threads undulates substantially in a warp plane and is alternately tangent to one main face and then to the other main face or to one side face.

4. A finished pneumatic tire according to claim 3, characterized by the fact that the warp planes are parallel to each other and parallel to any plane which is perpendicular to the main faces and parallel to the length of the ply.

5. A finished pneumatic tire according to claim 1, characterized by the fact that the woof threads are arranged between the warp threads, each woof thread undulating substantially in a woof plane and being alternately tangent to one side face and then the other when the fabric is arranged in such a manner as to have a generally flat shape.

6. A finished pneumatic tire according to claim 5, characterized by the fact that the woof planes are parallel to each other and perpendicular to the main faces.

7. A finished pneumatic tire according to claim 2, characterized by the fact that, at least in the central region, the woof threads are arranged substantially on several surfaces.

8. A finished pneumatic tire according to claim 7, characterized by the fact that, in the central region, the woof threads are arranged substantially on at least four surfaces.

9. A ply according to claim 7, characterized by the fact that these surfaces are planes parallel to the main faces.

10. A finished pneumatic tire according to claim 1, characterized by the fact that at least one side face has flat elementary faces when the fabric is arranged in such a manner as to have a generally flat shape.

11. A finished pneumatic tire according to claim 1, characterized by the fact that at least one side face is continuous when the fabric is arranged in such a manner as to have a generally flat shape.

12. A finished pneumatic tire according to claim 1, characterized by the fact that the stiffening threads have one or more orientations when the fabric is arranged in such a manner as to have a generally flat shape.

13. A finished pneumatic tire according to claim 12, characterized by the fact that the stiffening threads are arranged substantially in at least one plane, the stiffening threads of this plane having the same orientation.

14. A finished pneumatic tire according to claim 9, characterized by the fact that the stiffening threads are arranged substantially in at least one plane which are parallel to the planes in which the woof threads are arranged.

15. A finished pneumatic tire according to claim 1, characterized by the fact that the stiffening threads constitute warp threads and/or woof threads of the fabric.

16. A finished pneumatic tire according to claim 1, characterized by the fact that the stiffening threads, on the one hand, and the warp and woof threads of the body, on the other hand, are made of different materials.

17. A ply according to claim 1, characterized by the fact that the threads of the body have a cross section the surface of which is of smaller area than the area of the surface of the cross section of the stiffening threads.

18. A finished pneumatic tire according to claim 17, characterized by the fact that the warp and woof threads of the body have a cross section the surface of which has an area at most equal to one-quarter of the area of the surface of the cross section of the stiffening threads.

19. A finished pneumatic tire according to claim 1, characterized by the fact that the stiffening threads are made of an aromatic polyamide.

20. A finished pneumatic tire according to claim 1, characterized by the fact that the body is made, at least in part, of a thermoplastic material.

21. A finished pneumatic tire according to claim 1, characterized by the fact that the permeability of the fabric is at least equal to $10^{-11}$ $m^2.Pa^{-1}.s^{-1}$ for a fluid whose density is equal to 1000 $kg/m^3$ and whose dynamic viscosity is equal to 1 Pa.s.

22. A finished pneumatic tire according to claim 21, characterized by the fact that the permeability of the fabric is greater than $500 \times 10^{-11}$ $m^2.Pa^{-1}.s^{-1}$.

23. A finished pneumatic tire according to claim 1, characterized by the fact that the porosity of the fabric is at least equal to 50%.

24. A finished pneumatic tire according to claim 23, characterized by the fact that the porosity of the fabric varies from 70% to 90%.

25. A finished pneumatic tire according to claim 1, characterized by the fact that the ratio between, on the one hand, the rigidity of the fabric measured along each orientation of the stiffening threads and, on the other hand, the rigidity of the body alone measured along said orientation is at least equal to 10, these rigidity measurements being carried out for a relative elongation of 2%, the fabric being, for this measurement, without stiffening threads of orientation other than that along which the rigidity is measured.

26. A finished pneumatic tire according to claim 25, characterized by the fact that this ratio is at least equal to 30.

27. A finished pneumatic tire according to claim 1, characterized by the fact that the tire comprises a crown reinforcement, the ply constituting at least in part said crown reinforcement.

28. A finished pneumatic tire according to claim 27, characterized by the fact in the vicinity of the equatorial plane of the tire, the warp threads of the body are arranged substantially in planes parallel to the equatorial plane, the woof threads of the body and the stiffening threads of the ply being arranged substantially in cylinders of revolution whose axis is the axis of revolution of the tire.

29. A finished pneumatic tire according to claim 27 or 28, characterized by the fact that at least one main face of the ply constitutes a part of a face of the crown or is located at a distance from said face at most equal to one-fifth of the thickness of the crown; by the fact that the stiffening threads of the ply constitute at least one reinforcing assembly arranged substantially on a surface; and by the fact that in a radial plane the straight line passing through one end of this assembly and perpendicular to this reinforcing thread surface intersects said face of the crown at a point such that the distance from said point to the end M of said main face is at least equal to one-half of the maximum thickness of the ply, said end M being located on the same side as said point with reference to the equatorial plane of the tire.

30. A finished pneumatic tire according to claim 1, characterized by the fact that the cross-sectional width of the ply varies between a maximum width and a minimum width, that the stiffening threads are arranged in the ply in a plane parallel to the main faces and that, when the intersecting plane is perpendicular to the length of the fabric and to the main faces, the cross-section is such that the difference between, on the one hand, the width of the ply at the plane of the stiffening threads and, on the other hand, the maximum or minimum width of the cross-section is at least equal to the maximum thickness of the ply.

* * * * *

UNITED STATES PATENT AND TRADEMARK OFFICE
CERTIFICATE OF CORRECTION

PATENT NO. : 4,862,939
DATED : Sept. 5, 1989
INVENTOR(S) : Michel Merle

It is certified that error appears in the above-identified patent and that said Letters Patent is hereby corrected as shown below:

First page, Item 54, and Col. 1, first line, "..." should read --AT LEAST IN PART OF THREE-DIMENSIONAL FABRIC OF VARIABLE WIDTH CROSS SECTION; ARTICLES HAVING AT LEAST ONE SUCH PLY;--. Col. 2, line 24, "play" should read --ply--. Col. 3, line 57, "89" should read --9--. Col. 4, line 5, "n" should read --an--. Col. 8, line 51, "providing" should read --welding--. Col. 12, line 50, "cable" should read --cables--. Col. 13, line 20, after "body" insert --18--. Col. 15, line 36, delete "a" (2nd occurrence); line 37, before "arranged" insert --is--. Col. 17, line 18, "rigidty" should read --rigidity--; line 63, "widths" should read --width--. Col. 19, line 24, "are" should read --is--. Col. 20, line 25, after "fact" insert --that--.

Signed and Sealed this

Twentieth Day of November, 1990

Attest:

HARRY F. MANBECK, JR.

Attesting Officer

Commissioner of Patents and Trademarks